UNITED STATES PATENT OFFICE.

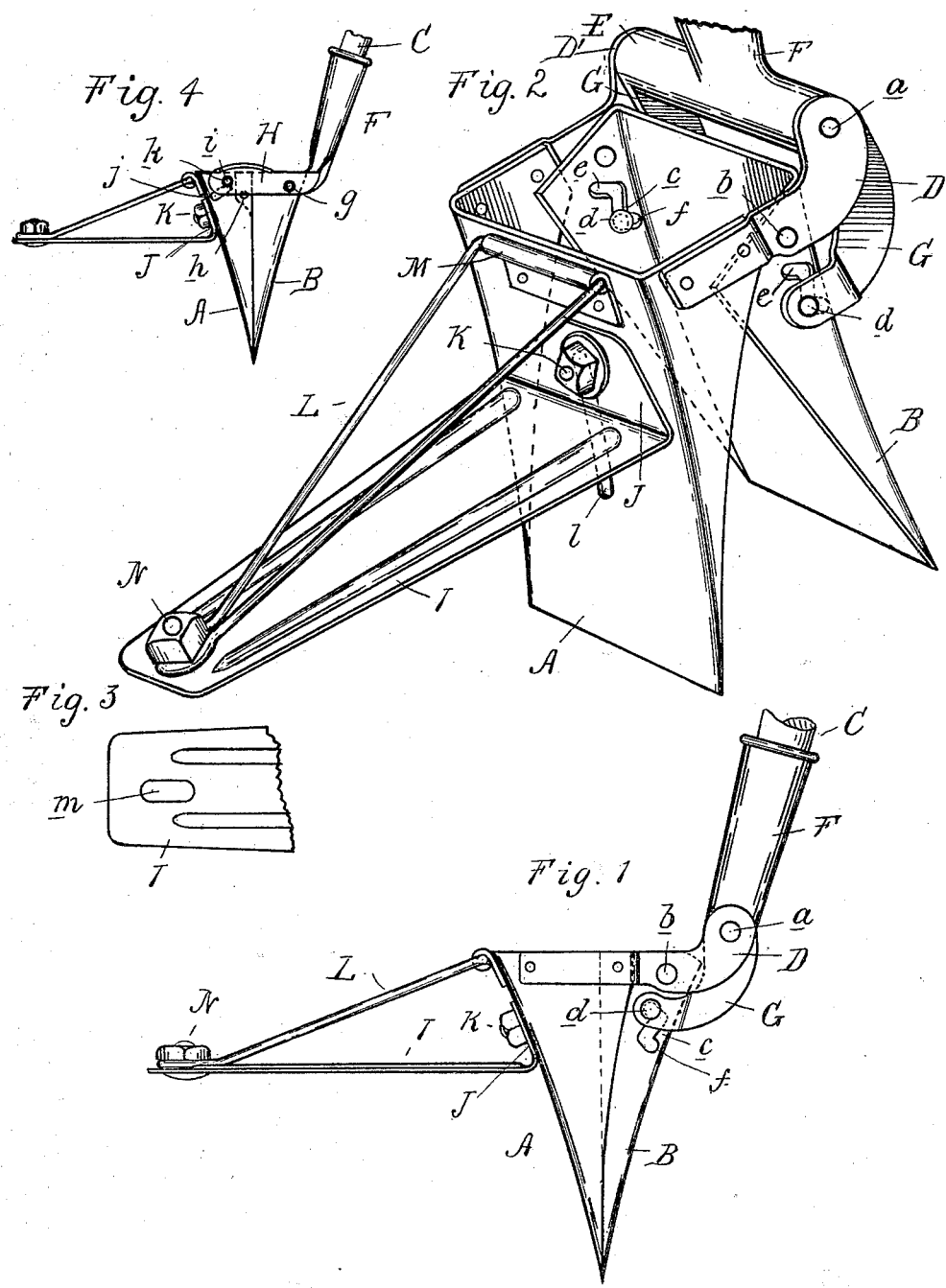
No. 695,128. Patented Mar. 11, 1902.
F. R. WELTON.
PLANTER.
(Application filed May 13, 1901.)
(No Model.) 2 Sheets—Sheet 1.
INVENTOR.
Frank R. Welton
WITNESSES.
Attorneys

FRANK R. WELTON, OF DETROIT, MICHIGAN.

PLANTER.

SPECIFICATION forming part of Letters Patent No. 695,128, dated March 11, 1902.

Application filed May 13, 1901. Serial No. 60,069. (No model.)

*To all whom it may concern:*

Be it known that I, FRANK R. WELTON, a citizen of the United States, residing at Detroit, in the county of Wayne and State of Michigan, have invented certain new and useful Improvements in Planters, of which the following is a specification, reference being had therein to the accompanying drawings.

The invention relates to planters of that type comprising a beak for holding the seed and a handle for operating said beak, adapted, when the latter is inserted in the ground, to open the jaws thereof and deposit the seed.

The invention consists in the means employed for normally locking the jaws of the beak from opening, together with an operating connection with the handle, whereby said jaws are unlocked by the initial movement of said handle.

The invention further consists in the construction of an adjustable foot having the double function of constituting a fulcrum in the opening movement of the jaws and an adjustable gage for determining the depth of planting.

The invention further consists in the peculiar construction, arrangement, and combination of parts, as hereinafter described and claimed.

Figure 5:
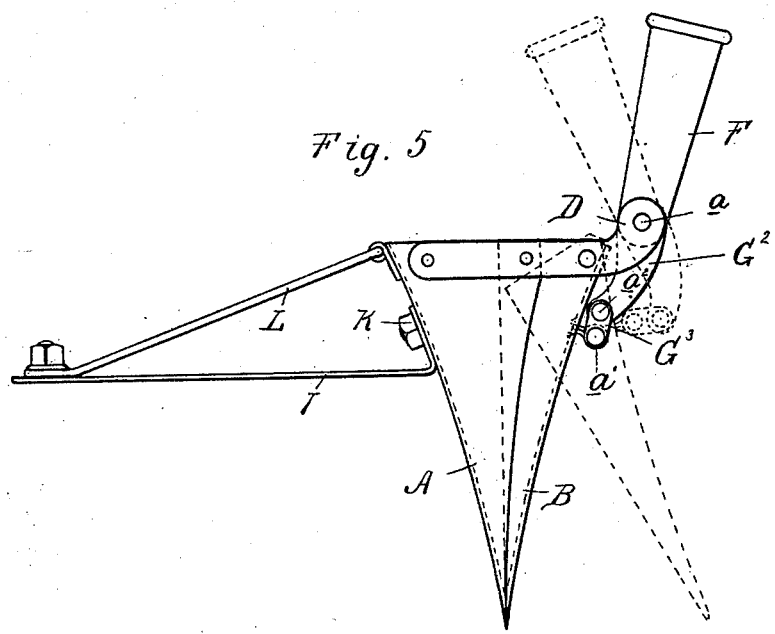
Figure 6:
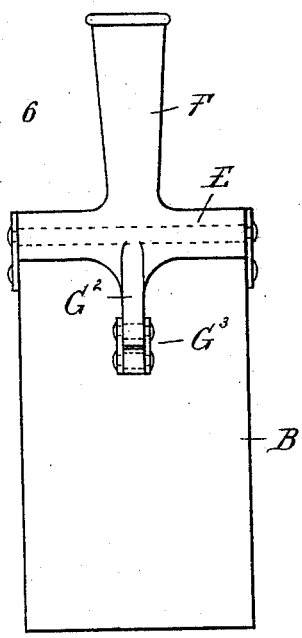

In the drawings, Figure 1 is a side elevation of one form in which the planter may be made. Fig. 2 is a perspective view thereof, showing the jaws of the beak open. Fig. 3 is a plan of a portion of the foot shown in Fig. 2. Fig. 4 is a side elevation of a modified construction. Fig. 5 is a similar view of still another modification, and Fig. 6 is a rear elevation of Fig. 5.

The beak of the planter may be of any suitable form comprising two jaws A and B, which are preferably formed of sheet metal. These jaws are hinged to each other and are also preferably hinged to the handle C. As shown in Figs. 1 and 2 of the drawings, this hinge connection is formed by providing the jaw A with the rearwardly and upwardly extending arms D and D', which are pivotally secured at $a$ to the cross-head E, formed at the lower end of the handle-socket F. The proportion of the parts is such that the pivots $a$ are located in a plane slightly in the rear of the beak, while the pivots $b$, which hinge the jaws to each other, are located forward of and below said pivots $a$. The cross-head E is provided with downwardly and forwardly extending arms G and G', which have a sliding pivotal connection to the jaw B on the opposite side of the pivot $b$. This connection is preferably formed by providing the sides of said jaw with slots $c$, preferably extending in a substantially radial line from the pivot $a$.

$d$ represents pins secured to the arms G G' and slidingly engaging with the slots $c$.

With the construction as thus far described it will be evident that the beak is supported through the joint action of the arms D D' and G G', the former pivotally attaching the beak to the handle-section and the latter limiting the turning of the arms D D' on the pivots $a$, thereby holding the beak in its normal upright position. It will be also understood that the jaws will be held normally closed, as the weight of the beak will tend to swing it downward and rearward, while the arms G G' form stops for limiting this movement of the rear jaw, thereby holding the jaws together. Thus when a seed is placed within the beak there will be but little tendency for it to open the jaws. In order, however, that the jaws may be positively locked from opening, the slots $c$ are preferably provided at their upper ends with offset portions $e$, extending transversely of the radial line from the pivots $b$. The weight of the beak will normally hold the pin $d$ in engagement with the offset portions $e$ and will thereby absolutely lock the jaws from opening by any pressure tending to separate them. When, however, the beak is inserted in the earth and the handle is moved forward, the pin $d$ will be withdrawn from the offset portion $e$ of the slot into the radially-extending portion $c$, while a further movement will press the jaw B rearward, the pin $d$ traveling longitudinally in the slot $c$. The beak is also preferably provided with means for positively locking the jaws from being closed by a lateral pressure of the earth thereon. To this end the slots $c$ are provided at the lower ends with oppositely-extending offset portions $f$. These are adapted to engage with the pins $d$ after the latter have traveled the length of the slot $c$, and when in engagement therewith the jaws cannot be closed.

In Fig. 4 a modified construction is shown in which the handle-socket F is provided with forwardly-extending arms H, to which the jaw B is pivotally secured at $g$. The jaws A and B are pivotally connected to each other at $h$, while the jaw A has a sliding pivotal connection with the arms H at $i$, formed by a pin engaging the slot $j$. The latter is preferably provided with an offset portion $k$, with which the pin $i$ is normally engaged in the closed position of the jaws. With this construction the jaws A and B can only be opened by a movement of the pin $i$ along the slot $j$, which permits of the turning of said jaws on the pivot $h$. This movement of the pin is, however, prevented as long as it is in engagement with the offset portion $k$, and the weight of the beak will tend to hold it normally in engagement with said offset.

In order to provide a fulcrum for turning the handle without moving the jaw A, the latter is provided with a projecting arm or foot adapted to rest upon the surface of the ground. This foot is preferably formed by a sheet-metal plate I and having the upturned flange J for attaching it to the jaw. This attachment is made adjustable by providing the jaw with a vertical slot $l$, through which the clamping-bolt K passes, so that the position of the plate I may be raised or lowered in relation to the jaw. To strengthen the plate I and prevent the springing thereof, the brace L is provided, which is pivotally connected to the jaw by an eye M and at its free end is adjustably secured to a plate I by a clamping-bolt N passing through a slot $m$ in the plate. With this construction the weight of the foot is very much less than would be necessary if the usual cast-metal construction were employed. At the same time the brace L holds the plate I rigid and the latter presents sufficient area to the surface of the ground to hold the jaw from moving. This foot also serves as an adjustable gage for determining the depth to which the seed is inserted in the ground, and when it is desired to alter the depth it is only necessary to loosen the clamping-bolts K and N and effect the proper adjustment.

In Figs. 5 and 6 another modification is illustrated, in which in place of the arms G and G' a single arm $G^2$ extends downward in rear of the jaw B. This arm is connected to said jaw by a link or toggle $G^3$, the proportion of the parts being such that in the closed position of the jaws the arm $G^2$ and link $G^3$ will have swung past the center line connecting their respective pivots, as shown in Fig. 5. Thus the jaws are absolutely locked from opening by internal pressure, as neither can move without diminishing the distance between the pivots $a$ and $a'$, and the arm and link will prevent such a movement. In the operation of the device when inserted in the ground the swinging of the handle will first swing out the pivotal connection $a^2$ between the arm $G^2$ and link $G^3$ and in the further movement of the handle will draw the jaw B rearward into the dotted position shown in Fig. 5.

It will be understood that in all of the constructions described the jaws of the beak are normally locked from opening, so that the seed when placed therein cannot be dropped until the beak is inserted in the ground. When thus inserted, the initial movement of the handle will unlock said jaws, after which a further movement of the handle will open the jaws and deposit the seed. In operation the seed is placed in the beak, the jaws of which are locked, and the beak is then inserted in the ground until the foot I rests upon the surface. The handle is then swung forward, which first unlocks the jaws and then separates them. In the construction shown in Figs. 1 and 2 the unlocking is effected by disengaging the pin $d$ from the offset $e$, after which the pin $d$ travels longitudinally of the slot $c$ until the jaws are fully opened. A further movement of the handle will engage the pin $d$ with the offset $f$ thereof, locking the jaws from being closed and preventing the picking up of the seed in the withdrawal of the beak.

It is desired to call special attention to the fact that the length of the arms G and G' between the pivots $a$ and $d$ is very much greater than the distance between the pivots $b$ and $d$. Thus the opening of the jaws may be effected by the movement of the handle through a much smaller arc than that through which the jaws swing. It is also desired to emphasize the fact that the jaws cannot be opened when the handle is stationary without raising the center of gravity of the beak. Thus even if the locking-offsets were omitted the weight of the seed within the beak could not easily open the jaws thereof, for in opening one of the jaws must be swung upward.

What I claim as my invention is—

1. In a planter, the combination with a beak having the jaws thereof normally locked from opening, of a handle hinged to swing in relation to said jaws and adapted to open the same and means whereby the initial swinging movement of said handle will unlock said jaws.

2. In a planter, the combination with a beak having the jaws thereof hinged together, of a handle movable in relation to both of said jaws and a connection between said jaws and handle for opening the former by a relative movement of the latter, said connection being adapted to lock said jaws from being opened by internal pressure.

3. A planter comprising a beak having a pivotal connection between the jaws thereof, a handle hinged to one of said jaws at one side of said pivotal connection, an arm extending from said handle to the opposite side of said pivotal connection, and there connected to the other of said jaws.

4. A planter comprising a beak having a pivotal connection between the jaws thereof, a handle hinged to one of said jaws at one side of said pivotal connection, an arm extending from said handle to the opposite side of said pivotal connection and a traveling pivotal connection between said arm and the other of said jaws.

5. A planter comprising a beak having a pivotal connection between the jaws thereof, a handle hinged to the forward jaw in rear of said pivotal connection, and an arm extending from said handle to the opposite side of said pivotal connection and having a sliding pivotal connection with said rear jaw.

6. A planter comprising a beak having a pivotal connection between the jaws thereof, a handle hinged to one of said jaws in rear of said pivotal connection, and an arm extending from said handle to the opposite side of said pivotal connection having a sliding pivotal connection with the opposite jaw comprising a pin on the one engaging with a radial slot in the other.

7. A planter comprising a beak having a pivotal connection between the jaws thereof, a handle hinged to one of said jaws in rear of said pivotal connection, an arm extending from said handle to the opposite side of said pivotal connection and there engaging with the other of said jaws and a coöperating guide and sliding pin for forming said engagement, the former having a portion extending substantially radially from said pivotal connection permitting said pin to travel therein when said jaws are opened, and an offset portion for preventing movement of said pin to lock said jaws.

8. A planter comprising a beak having a pivotal connection between the jaws thereof, a handle hinged to one of said jaws at one side of said pivotal connection, an arm extending from said handle to the opposite side of said pivotal connection and there slidingly connected to the other of said jaws, said sliding connection comprising a guide extending radially from said pivotal connection and having offsets at opposite ends thereof, and a pin engaging said guide adapted to travel during the movement of the jaw and when in engagement with said offsets to lock said jaws from movement, respectively in their open and closed positions.

9. In a planter, the combination with the beak having stationary and movable jaws, of a foot for said stationary jaw comprising a sheet-metal ground plate vertically adjustably secured to said jaw and a brace-rod hinged to said jaw and adjustably secured to the outer end of said plate.

In testimony whereof I affix my signature in presence of two witnesses.

FRANK R. WELTON.

Witnesses:
M. B. O'DOGHERTY,
H. C. SMITH.